(No Model.)
H. T. COOK.
LEAF AND FLOWER ALBUM.
No. 412,729. Patented Oct. 15, 1889.
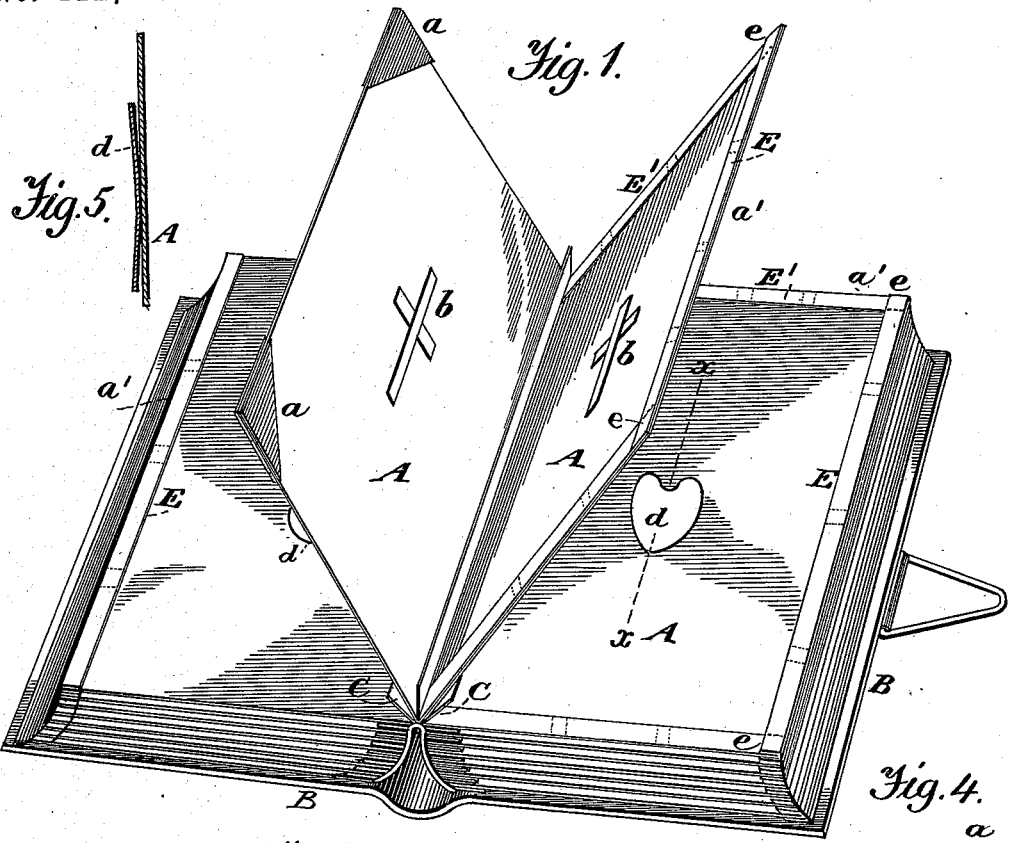
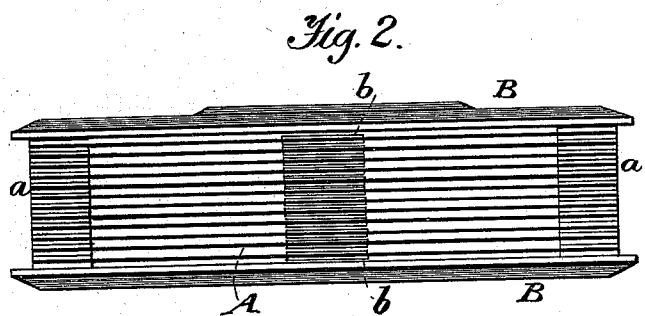
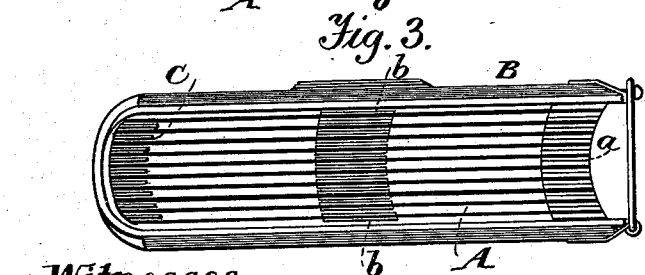
Witnesses.
A. Ruppert.
E. C. Hough.
Inventor:
Hiram T. Cook
by Franklin H. Hough
his Attorney

UNITED STATES PATENT OFFICE.

HIRAM T. COOK, OF ALBA, MICHIGAN, ASSIGNOR OF ONE-HALF TO FRANK D. HOPKINS, OF SAME PLACE.

LEAF AND FLOWER ALBUM.

SPECIFICATION forming part of Letters Patent No. 412,729, dated October 15, 1889.

Application filed October 23, 1888. Serial No. 288,898. (No model.)

*To all whom it may concern:*

Be it known that I, HIRAM T. COOK, a citizen of the United States, residing at Alba, in the county of Antrim and State of Michigan, have invented certain new and useful Improvements in Leaf and Flower Albums; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to albums that are designed to receive leaves, flowers, tokens of hair, and keepsakes of like nature that are usually stowed away in books and albums.

The object of the invention is to provide an album that will have its leaves thickened at their edges—preferably at their corners—and which will have stubs bound in between the leaves, so that when the book is closed the opposing sides of the leaves will stand apart equal to the thickness of the stubs and the increased thickness of the edges or corners of the leaves, whereby room is obtained to place mementoes, of whatever nature, between said leaves without affecting or bulging the book.

A further object of the invention is to embellish the pages of the book by means which will at the same time serve as holders to retain in place the mementos or other articles arranged on the leaf. This means may consist of strips suitably arranged on the leaf and secured thereto at intervals, or of pieces of thin sheet material cut in fanciful designs or otherwise ornamented and secured to the leaf at intervals, the free portions between the sheets and the strips or the ornamental pieces serving to receive the stems of the leaves and the flowers or other portions of the articles placed on the leaf and retain them in position.

The improvement consists in the novel features, which hereinafter will be more fully described and claimed, and shown in the accompanying drawings, in which—

Figure 1 is a perspective view of an album embodying my invention, showing it open. Fig. 2 is a front view of the edge of the album, the same being shown as closed. Fig. 3 is an end view of the closed album. Fig. 4 is a side view of one of the leaves detached, and Fig. 5 is a section upon line *x x* of Fig. 1.

The album is composed of a series of leaves A, which are bound together and inclosed in a suitable cover B, the leaves being of uniform size and sufficiently stiff to support light articles. The leaves are thickened at their outer edges in any desired manner, preferably by securing extra pieces, as *a*, thereto on one or both sides thereof. The pieces *a* are preferably applied to the corners of the leaves, although this is not essential, as they may be located at any point on the edge of the leaves, as shown at *a'*. The purpose of thus thickening the edge of the leaves is to obtain room between the leaves, when the book or album is closed, in which articles may be stowed without bulging the covers of the album. The stubs C, bound in between the inner edges of the leaves, give the necessary space between them to preserve a uniform thickness of the book or album and obtain the required room to receive the articles placed between the leaves. The leaves are adorned either by having strips, as *b*, suitably arranged thereon and secured thereto at intervals, or by having pieces of sheet material, as *d*, cut in fanciful designs or otherwise ornamented, applied and secured thereto at intervals. These ornamentations serve also as holders to receive and retain the articles placed on the leaves, the articles being held between the leaf and the part of the ornamentation not gummed or secured to the said leaf. The ornamentations must be of a less thickness than the increased thickness of the edges of the leaves, so that the combined thicknesses of the articles held in place by the ornamentation and the ornamentation itself will not exceed the increased thickness of the edges of the leaves, otherwise a bulging of the sides of the cover of the album would result before the album would be filled.

In Fig. 1 strips E and E' are shown applied to the front, the top, and the bottom edges of a leaf, the points of attachment being indicated in dotted lines, and the said strips overlapping at the corners at *e*. By this disposition of the parts a double thickness is had at the corners and a single thickness of material between the corners. These strips being secured at intervals to the sheet, provision is had between the points of adhesion to receive a portion of the article to be retained in position, as will be readily comprehended.

Having thus described my invention, what I claim to be new is—

1. The herein-described book or album having pieces arranged between the leaves at their edges to hold their opposing sides apart, and having ornamental pieces applied to the sides of the leaves and secured thereto at intervals, whereby the stems of leaves and other articles may be inserted between the said pieces and the leaves, substantially as and for the purpose specified.

2. The herein-described leaf for albums and books, having its edges or corners thickened by separate pieces applied thereto between the edges and secured at intervals, whereby spaces are left between the points of attachment for the insertion of the stems of leaves and other articles, substantially as described.

In testimony whereof I affix my signature in presence of two witnesses.

HIRAM T. COOK.

Witnesses:
AARON W. NICHOLS,
WM. H. BEANE.